United States Patent [19]

Packard

[11] Patent Number: 4,574,324

[45] Date of Patent: Mar. 4, 1986

[54] GROUND FAULT CIRCUIT INTERRUPTER

[75] Inventor: Thomas N. Packard, Syracuse, N.Y.

[73] Assignee: Pass & Seymour, Inc., Solvay, N.Y.

[21] Appl. No.: 539,153

[22] Filed: Oct. 5, 1983

[51] Int. Cl.[4] .............................................. H02H 3/33
[52] U.S. Cl. ....................................... 361/46; 361/45; 361/91; 361/156
[58] Field of Search ..................... 361/44, 45, 46, 91, 361/156

[56] References Cited

U.S. PATENT DOCUMENTS

| | | | |
|---|---|---|---|
| 3,213,321 | 10/1965 | Dalziel ................................... | 361/46 |
| 3,633,070 | 1/1972 | Vassos et al. ......................... | 361/46 |
| 3,731,148 | 5/1973 | Fournis ................................. | 361/45 |
| 3,953,766 | 4/1976 | Howell et al. ........................ | 361/45 |
| 4,063,299 | 12/1977 | Munroe ................................. | 361/45 |
| 4,068,276 | 1/1978 | Pintell ................................... | 361/46 |
| 4,246,621 | 1/1981 | Tsukioka ............................... | 361/91 |

*Primary Examiner*—Patrick R. Salce

*Attorney, Agent, or Firm*—Charles S. McGuire

[57] ABSTRACT

A circuit including a differential transformer for sensing an imbalance in the current flow through hot and neutral wires connected between a power source and load and a relay operable to break the connection in response to an imbalance of predetermined magnitude. The two movable relay contacts are placed directly in the two wires and are normally open, being closed when power is supplied to the relay coil, the input side of which is connected to a switching transistor. Features include connection of the relay coil as a series pass element in the feed circuit to reduce power dissipation and heat, decreasing the likelihood of contact chatter or welding, providing increased protection for the switching transistor without increasing relay contact opening time, and providing fail-safe operation for all of the more common types of failures in the protective circuitry. Open neutral and grounded neutral protection are also provided.

28 Claims, 1 Drawing Figure

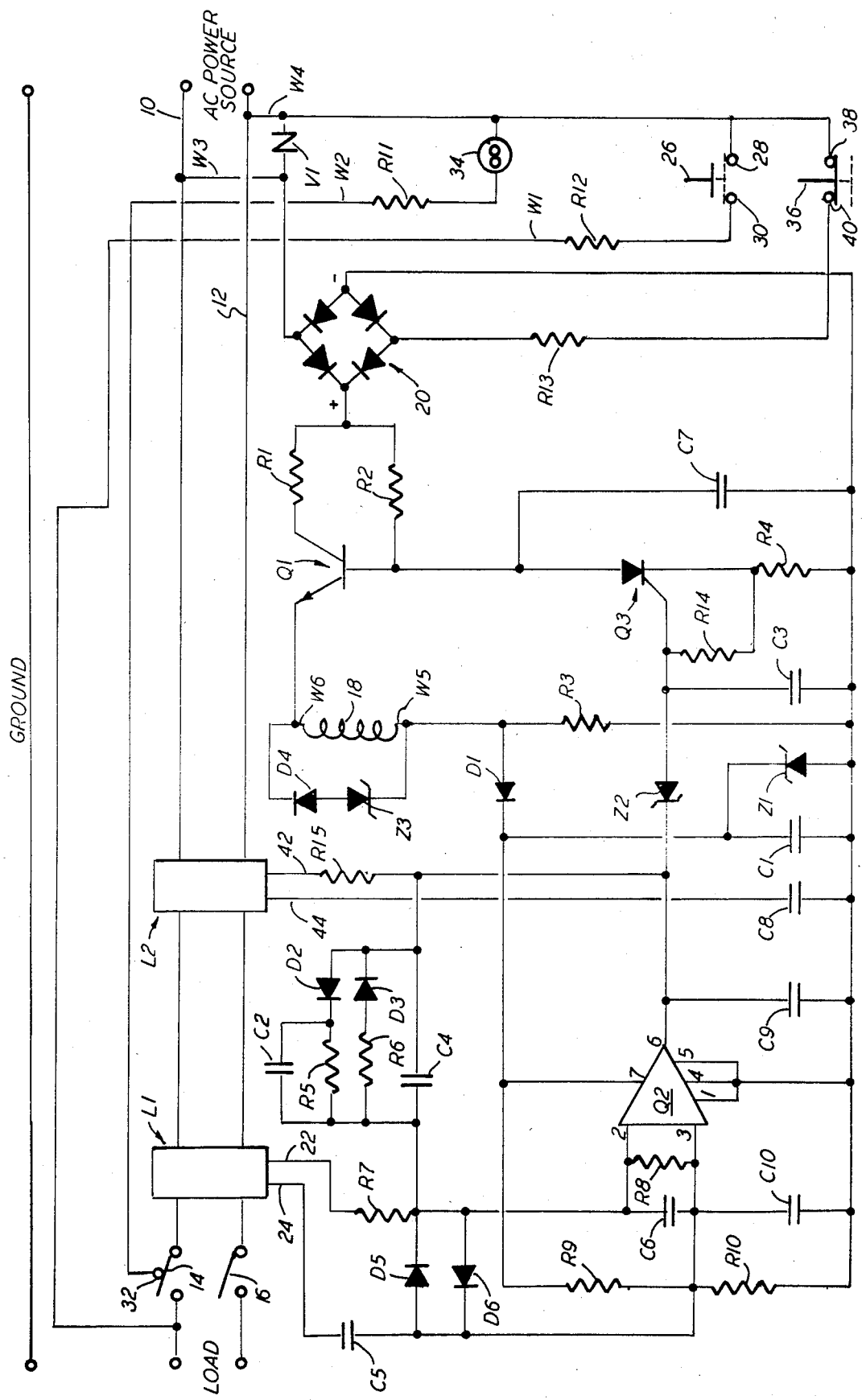

GROUND FAULT CIRCUIT INTERRUPTER

BACKGROUND OF THE INVENTION

The present invention relates to the class of electrical devices which are generally known as ground fault circuit interrupters. More specifically, the invention relates to novel features of circuitry which interrupt the lines between a source of electrical power and a load in response to an imbalance of predetermined magnitude in current flow through the current-carrying wires connected between the source and load.

The possibility of injury and/or damage which is inherent in the operation of any electrical system of significant magnitude has led to the provision of various protective devices. Among these are the class of electrical apparatus which has come to be known as ground fault circuit interrupters (GFCI). In general, such apparatus senses and/or responds to a condition in a line carrying electrical current which indicates a presently or imminently dangerous condition, such as the presence of a current path other than the intended path of normal operation. Response to the sensed dangerous condition may be in the form of alarm actuation and/or opening the line (interrupting the circuit) between the source of power and the load.

The present invention is concerned with the type of GFCI which utilizes a differential transformer to sense an imbalance of current flow in the conductors of a distribution system and provide a signal in response to the imbalance which actuates a relay to remove power from the load. The general object of the invention is to provide an electrical circuit for such a GFCI having novel and improved features.

A more specific object is to provide a GFCI including a relay coil in a circuit configuration having lowered total power consumption, thereby producing less heat, than similar prior circuits.

A further object is to provide novel and improved circuit mean operable to actuate an electro-mechanical relay from a source of pulsating DC voltage in an improved manner, reducing the possibility of contact chatter or welding.

Another object is to provide a GFCI having a relay coil receiving an input from a transistor and a novel circuit arrangement which not only protects the transistor upon removal of the coil input signal, but also provides more rapid field collapse and does not increase contact opening time.

An additional object and important advantage of the invention is to provide a GFCI with novel circuit features providing an optimum fail-safe capability: that is, if the GFCI fails, malfunctions or is defective in any of a variety of ways, the circuit between source and load either opens in response to such failure or is already open and cannot be closed, thereby not defeating the desired protection.

All of the foregoing features and advantages are incorporated in a GFCI which also provides protection in the event of a grounded or open neutral line, as well as circuit testing and resetting capabilities.

Other objects will in part be obvious and will in part appear hereinafter.

SUMMARY OF THE INVENTION

In accordance with the foregoing objects the invention contemplates a GFCI having a first differential transformer with the hot and neutral conductors of a power line extending from an electrical power source to a load each forming a single-turn primary, and a secondary adapted to sense an imbalance in current flow through the two conductors and generate a signal in response thereto. The coil of a conventional electromachanical relay receives power through a switching transistor to close the normally open relay contacts, one of which is interposed in each of the conductors, when the source is connected to the load and operation is normal, i.e., current flow through the hot and neutral conductors is essentially equal. The signal produced in response to a sensed imbalance above a predetermined threshhold level triggers a circuit which removes the input to the relay coil, deactuating the relay and opening the contacts.

A diode bridge rectifier is connected across the AC lines from the power source to provide a pulsating DC output. One side of the bridge output is connected directly to ground potential and the other side to a pair of resistors, one having a value significantly larger (e.g., 30 times) than that of the other. The lower value resistor is connected to the collector, and the larger resistor to the base of an NPN transistor, the emitter of which is connected to the input of the relay coil.

An imbalance in current flow through the two conductors forming the primaries of the transformer induces a current in the secondary which is connected to the input terminals of an operational amplifier. Through the action of the amplifier, the current charges a capacitor in an amplifier feedback circuit to a level exceeding the breakover voltage of a zener, thereby charging an additional capacitor to a level exceeding the firing voltage of an SCR, the gate of which is connected to such capacitor. Firing of the SCR essentially removes base current from the transistor feeding the relay coil, thereby stopping current flow to the coil, deactuating the relay and opening the contacts in the line between the source and load. A resistor connected to the cathode of the SCR has a value established by that of the firing capacitor to cause the SCR to remain in a conductive state.

In GFCIs designed to operate a relay from a pulsating DC input, a resistor is normally used as the series pass element into the circuit's DC power supply network. In the circuit of the present invention, the relay coil is used as the series pass element, eliminating the resistor and reducing overall circuit wattage, e.g., 50% with a commensurate and desireable reduction of heat.

Connecting the coil in the manner just described and using a relatively large capacitor in the power supply network, comprising the capacitor in parallel with a zener, may also reduce the possibility relay contact chatter or welding.

The circuit of the present invention also incorporates a zener and a free-wheeling diode connected in series across the input and output sides of the relay coil. The diode provides an alternate current path, suppressing what would otherwise be a voltage spike at the coil when the transistor stops conducting in order to protect the transistor. The zener dissipates the energy which would otherwise be present on the coil, thereby reducing the field collapse time and allowing the relay contacts to open in a shorter time, which may be critical in ground fault situations. Although a somewhat greater voltage is imposed on the transistor by utilizing the zener, this is still far below the rated voltage of the transistor.

The circuit preferably includes a second transformer having a primary winding with the conductors of the power line providing two single turn secondary windings. This provides means for deactuating the relay and opening the switch contacts in the event of a ground fault when the neutral conductor is grounded on the load side. Since the relay switches are normally open unless and until the relay is actuated, protection is automatically provided in the event of an open neutral conductor. This and other "failsafe" features provided by the circuit configuration, components and physical wiring will become apparent as the following detailed description progresses.

BRIEF DESCRIPTION OF THE DRAWING

The single FIGURE is a schematic diagram of the preferred circuit of the invention.

DETAILED DESCRIPTION

An AC power source and load, respectively indicated at the right and left sides of the drawing, are connected by a power line including conductors 10 and 12, hereinafter termed hot and neutral conductors, respectively, of what will typically be a 120 or 240 volt, 60 hertz, single phase, AC power distribution system. It will be understood, however, that the GFCI of the present invention may be employed in distribution systems of other voltages and frequencies, as well as in multiphase systems. In many typical applications, a power cord terminating in a plug will extend from the load for insertion in an electric receptacle having contacts connected to the power source. A ground wire, so labeled, also extends from the load to a grounding terminal, normally at the receptacle to which the plug is connected. The circuit components of the present invention may conveniently be incorporated in a plug-in module such as described in copending application serial number 539,154, filed of even date herewith and assigned to applicant's assignee, although the particular packaging of the components is of no consequence to the present invention.

Certain faulty conditions in the electrical wiring, as is well known, may result in serious damage to equipment and/or injury or electrocution of individuals coming in contact therewith. Normally, the neutral wire provides the path back to ground for current flowing from the source, through the hot wire, to the load, and current flow through the two conductors will be essentially equal, except for noise disturbances. However, if a wire or the line cord should break, or insulation become worn, or other such defects develop, another path to ground may be established for current flow. This ground path may be, for example, through an individual in contact with an appliance or other equipment which constitutes the load, particularly when well grounded, as by standing on a wet or moist surface.

Current flow to ground at or near the load other than through the neutral conductor produces an immediate imbalance in current flow through the hot and neutral conductors between the load and source. This imbalance may be sensed, as by a differential transformer developing a signal in response thereto, and the signal used to open the circuit. Such equipment is in widespread use and is commonly referred to as a ground fault circuit interrupter (GFCI), although capability may also be provided for protecting against other defective conditions such as open or grounded neutral line.

The GFCI of the present invention includes a conventional electro-mechanical relay having movable switches 14 and 16 interposed in conductors 10 and 12, respectively, between the source and load. Switches 14 and 16 are closed, providing circuit continuity through the two conductors, when relay coil 18 is energized.

Power for energizing coil 18 is provided from conductors 10 and 12 through a conventional diode rectifier bridge, indicated generally by reference numeral 20. The output of bridge 20, in the form of a pulsating DC voltage, is connected on one side (−) to ground potential and on the other side (+) to a pair of resistors R1 and R2. Resistors R1 and R2 are respectively connected to the collector and base of NPN transistor Q1. The value of resistor R1 is much smaller than resistor R2 (e.g., 330 ohms vs. 10,000 ohms), so that the collector current will be large with respect to the base current of transistor Q1 when conductors 10 and 12 are connected to the source, and current flow is established through the emitter to the input side of relay coil 18. The opposite side of the coil is connected to ground potential through diode D1 and capacitor C1, the latter connected in parallel with zener Z1. An additional ground path is provided through resistor R3 in the disclosed circuit in order to avoid imposing excessive currents on zener Z1. In some embodiments utilizing relatively high impedance relay coils, the additional ground path and resistor R3 may be unnecessary.

Thus, as soon as conductors 10 and 12 are connected to the AC source, with no defects in the line, coil 18 is energized and switches 14 and 16 are closed to provide power to the load. When a ground fault develops the resulting imbalance of current flow through conductors 10 and 12, which form the primaries of differential transformer L1, induces a current in the secondary, e.g., a coil wound on a magnetic core through which conductors 10 and 12 pass. The leads to and from the secondary of transformer L1 are denoted by reference numerals 22 and 24, respectively, and are connected, through a resistor and capacitor described later, to inverting and non-inverting input terminals 2 and 3 of operational amplifier Q2. Amplifier Q2 functions in the same manner as the amplifier of the GFCI circuitry shown and described in U.S. Pat. Nos. 3,936,699 and 4,024,436, both of William H. Adams, and assigned to applicant's assignee, to which reference may be made for any additional details of operational description. It is to be noted that the present GFCI, as in that of the referenced patents, is so configured that by using a high gain amplifier the apparent load resistance (across input terminals 2 and 3) is very small, to the point of being essentially a short circuit. Accordingly, the output voltage of transformer L1 is essentially independent of core permeability, allowing the use of less expensive ferrite cores, which is preferred in the present GFCI.

Upon current flow in the secondary of transformer L1, capacitor C2 in the amplifier feedback circuit (described later in more detail) is charged by an amount proportional to the current flow in the transformer secondary. If secondary current flow is sufficiently large, the voltage at output terminal 6 of amplifier Q2 (equal to the DC voltage at input terminal 3, plus the accumulated DC voltage on capacitor C2, plus the forward voltage drop of diode D2) exceeds the breakover voltage of zener Z2, plus the gate trigger voltage of SCR Q3. Capacitor C3 is then charged to the firing voltage of SCR Q3. Upon firing of SCR Q3, essentially all base current is removed from transistor Q1, now being directed through the anode and cathode of SCR Q3 to ground through resistor R4.

When base current is removed from transistor Q1, it is no longer biased into conduction and current flow to relay coil 18 stops. The relay is thus deactuated and switches 14 and 16 open, interrupting the circuit between the source and load due to the sensed ground fault. The values of capacitor C3 and resistor R4 are established to cause SCR Q3 to remain in a conductive condition after firing. That is, the voltage drop across resistor R4 causes capacitor C3 to hold the charge which was developed through zener Z2. Therefore, SCR Q3 remains in the conductive or "on" condition even after current flow through zener Z2 has stopped, and coil 18 cannot be re-energized to actuate the relay until the charge has been removed from capacitor C3.

The GFCI is provided with means for testing for proper operation, which is in the nature of imposing an artificial fault to insure that the relay switches open, and thereafter resetting to resume normal operation. The test switch is in the form of pushbutton member 26 which may be manually moved against a spring bias from the solid to the dotted line position to close the circuit across contacts 28 and 30. With conductors 10 and 12 connected to the power source and circuit operation normal, relay switches 14 and 16 will be closed, as previously explained. Moving test switch member 26 to the closed (dotted) position connects hot line 10 on the load side of transformer L1 to neutral line 12 on the source side, thereby providing a path between the two conductors which bypasses the transformer. If the GFCI is operating properly, this should produce an imbalance in current flow through the portions of conductors 10 and 12 forming the primary of transformer L1, deactuating the relay in the manner previously described. When relay switches 14 and 16 open, switch 14 connects hot line 10 through contact 32 to test lamp 34 which is connected on the opposite side to neutral conductor 12, thereby illuminating the lamp to indicate that the circuit has reacted in the desired manner.

When test switch member 26 is released, it returns to the open (solid)position. However, since SCR Q3 remains in the conductive state due to the charge on capacitor C3, as also previously explained, the relay is not re-actuated even though conductors 10 and 12 are still connected to the source, and switches 14 and 16 remain open. In order to resume normal operation, reset switch member 36 may be moved against a spring bias from the solid position, wherein it serves to close the circuit across contacts 38 and 40, to the dotted position. This disconnects neutral line 12 from one of the inputs to bridge 20, thereby stopping current flow through SCR Q3 and allowing capacitor C3 to discharge. When reset member 36 is released it returns to the closed (solid) position and the relay will again be energized to close switches 14 and 16, connecting the source to the load, since SCR Q3 is no longer conductive. Lamp 34 goes off and normal operation is resumed. Of course, capacitor C3 will also be discharged by disconnecting conductors 10 and 12 from the AC source, and normal operation will resume when they are again connected.

A second differential transformer L2 is preferably provided, as is the usual practice, to insure that the GFCI will operate to interrupt power from the source in the event neutral conductor 12 is grounded at the load side, as sometimes occurs, for example, by a mistake in wiring. In transformer L2 the primary is formed by the core winding from which leads 42 and 44 extend, and conductors 10 and 12 form the secondaries. Transformer L2 couples a few millivolts to conductors 10 and 12, as also described in previously mentioned U.S. Pat. Nos. 3,936,699 and 4,024,436, which, under normal conditions, produces no current in conductors 10 and 12 since there is no return path. If a low impedance to ground is established in neutral conductor 12 at the load side, however, a return path is established and the few millivolts coupled to conductors 10 and 12 by transformer L2 will cause some current flow through the secondary of transformer L1. This current flow, due to the few millivolts of coupled voltage, will become large enough to generate in transformer L1 a voltage equal to the voltage at transformer L2 divided by the gain of amplifier Q2, and the latter will break into self-sustained oscillation. The voltage at output pin 6 of amplifier Q2 will exceed the breakover voltage of zener Z2, SCR Q3 will fire and the relay will be deactuated, as previously described.

Thus, the GFCI provides not only ground fault protection, but also protects against the inadvertent grounding of a neutral conductor, opening the line between source and load in either case by deactuation of a relay. It will be noted that the other circuit defect for which protection is often required, i.e., an open neutral line, is automatically provided by having the relay contacts normally open. That is, no power is provided to the load until the GFCI is connected to the power source and the relay is actuated. If the neutral line is open on the source side of the GFCI when the connection is made, the relay, of course, will not be actuated. If the neutral line is open on the load side, or becomes open at any point after the GFCI is connected to the power source, power is immediately removed from the relay coil and switches 14 and 16 open to interrupt the circuit in the desired manner.

Although the GFCI must operate reliably to provide the necessary degree of protection, it should not operate to interrupt the circuit in response to line disturbances which are merely electrical noise which would cause no physical harm or damage. The previously mentioned feedback circuit of amplifier Q2, including capacitor C2 and diode D2, together with resistors R5 and R6, diode D3 and capacitor C4, makes the GFCI slower to respond to low level faults whereby, if such faults are of brief duration, as in the case of many noise disturbances, the GFCI will not operate to interrupt the circuit.

When transistor Q1 is turned off by removal of the base current when SCR Q3 fires, a voltage spike is produced at coil 18 which may be potentially damaging to transistor Q1. Free-wheeling diode D4 is connected in parallel with coil 18 to provide an alternate current path, thereby suppressing the voltage spike and protecting transistor Q1. However, while preventing potentially damaging current flow through the transistor, the current flow through diode D4 introduces an additional time factor required for field collapse and thus for switch opening of the relay after the GFCI has been triggered by a ground fault. Zener Z3 is connected across coil 18, in series with diode D4, to dissipate the energy which would otherwise be present on the coil, thereby essentially eliminating the field collapse time and permitting the relay switches to open much faster in only the normal mechanical delay time. Since the detected fault may be a current path to ground through an individual, it is essential that the switches open to interrupt the circuit in the shortest time possible. Thus, the disclosed GFCI provides the necessary protection for the transistor while also insuring that the circuit is interrupted in the shortest possible time. Although a somewhat larger voltage is imposed on the transistor by the presence of zener Z3 than would otherwise be the case, the voltage is still well within acceptable limits. For example, the voltage may be increased from 0.6 volts to 27.6 volts, but this would present no danger of damage to a 200 volt transistor.

As previously mentioned, the circuit configuration of the present GFCI reduces power consumption and heat by placing relay coil 18 directly in the feed circuit to capacitor C1 and zener Z1, as opposed to the conventional practice of using a rather large resistor as the series pass element to the capacitor and zener. The series pass resistor is eliminated in the present GFCI, thereby reducing power comsumption by something on the order of 1.5 watts. Also, in the present GFCI, capacitor C1 has a capacitance large enough to increase the charging current to a level placing significant additional voltage on relay coil 18. This insures that the relay switches are driven home when the coil is energized, avoiding chatter of the contacts and reducing the risk of contact welding, which may occur at lower levels of coil voltage when the relay is energized with pulsating DC.

The circuit configuration of the present GFCI includes a number of significant fail-safe features; that is, if damage to the unit or malfunction of certain components should occur, the GFCI operation is such that the circuit between source and load will not remain uninterrupted when it should be open. Possible malfunctions include developing a short circuit through transistor Q1 or SCR Q3. If a short develops across the collector and emitter of transistor Q1 and a condition occurs which fires SCR Q3 (detecting a ground fault, closing the test switch, etc.) a large power surge is applied to resistor R1 which, as previously mentioned, is quite small compared to resistor R2. The power rating of resistor R1, e.g., ⅛ watt, is small enough that the power applied thereto when a collector to emitter short exists in transistor Q1 and SCR Q3 fires literally blows out resistor R1, in the nature of a fuse. Current flow to coil 18 is stopped by the open circuit thus created, and contacts 14 and 16 open as desired. The GFCI cannot be placed back in operation, of course, until resistor R1 is replaced, as well as the shorted transistor. If a short develops through SCR Q3, this is the equivalent of firing the SCR, whereby the circuit is interrupted in the same manner as when a ground fault or grounded neutral is sensed.

If any terminal of transistor Q1 becomes disconnected for any reason, the transistor cannot conduct current to relay coil 18 and the relay switches cannot close. Therefore, the circuit from source to load cannot be completed until the defect is corrected. Thus, the GFCI is fail-safe both when transistor Q1 is short circuited and when it is disconnected. If a terminal of SCR Q3 should become disconnected, on the other hand, the circuit would not be interrupted in the event of a sensed ground fault or grounded neutral, and the only way to detect such a defect would be by operating the test switch which in this case would not open the relay switches and turn on the test lamp. However, the possibility of a terminal of SCR Q3 becoming disconnected is much less than that of a terminal of transistor Q1 becoming disconnected since SCR Q3 operates only upon sensed faults or testing, while transistor Q1 is in constant use during normal operating conditions and is therefore subject to far more stress than SCR Q3.

Although the present invention is concerned with the GFCI electrical or electronic features of construction and operation, as opposed to its physical packaging, a convenient means of incorporating the GFCI in a plug-in module is described in previously-mentioned application Ser. No. 539,154. As described therein, all of the components except the relay are mounted upon a printed circuit board and affixed thereto by the usual solder connections. In this configuration, there are a total of six electrical wires connected at one end to a terminal on the printed circuit board and at the other end to a terminal not on the board. The schematic representations of these wires are indicated in the drawing hereof by the reference characters W1-W6. Wire W1 connects the load side of the GFCI to test switch terminal 30 on the circuit board; wire W2 connects relay terminal 32 with lamp 34, which is also mounted on the board; wires W3 and W4 connect hot and neutral conductors 10 and 12, respectively, to terminals on the board; wires W5 and W6 connect the opposite sides of relay coil 18 to the appropriate circuit board terminals.

It will be noted that in the event any of wires W3, W4, W5 or W6 should become broken or disconnected at either end, relay coil 18 cannot be energized, or is immediately de-energized if already in operation. Therefore, operation is safe in the event of such a failure since the load is not connected to the source, or is immediately disconnected. Breaking or disconnecting one or both of wires W1 and W2 has no effect on proper operation of the GFCI to interrupt the circuit in the event of fault or malfunction. In either case, closing the contacts through the test switch will not result in illumination of test lamp 34, indicating that there is a malfunction in the GFCI, which therefore should not be used until the problem is identified and corrected.

While the foregoing description adequately explains those features of construction and operation of the GFCI with which the present invention is concerned, particularly when taken with the disclosure of previously referenced U.S. Pat. Nos. 3,936,699 and 4,024,436, the general purpose of each of the schematically illustrated components not yet mentioned will now be set forth. Resistor R7, through which lead 22 of the secondary of transformer L1 is connected to amplifier Q2, is a small resistor which allows variations in core permeability due to temperature variations to compensate for temperature coefficients of other components. Capacitor C5, through which lead 24 is connected to the amplifier input, renders the DC gain of amplifier Q2 unity, while shorting or coupling essentially all AC signals from the secondary winding of transformer L1 to amplifier Q2. Diodes D5 and D6 clamp noise from the secondary of transformer L1 in either polarity. Capacitor C6 is connected across the input terminals of amplifier Q2, also for the purpose of screening out spurious noise. Resistor R8 is also connected across the amplifier inputs to provide an alternate short-circuit path for the transformer secondary to discharge DC voltage which may occur on capacitor C5. Resistors R9 and R10 provide a desired value of DC bias potential at non-inverting input terminal 3 of amplifier Q2.

Resistor R11 provides a voltage drop to prevent burning out test lamp 34. Resistor R12 establishes the desired current level for test purposes, normally specified as 8 milliamps. Resistor R13 provides protection in the event of failure of one or more of the diodes of bridge circuit 20, burning out in the same manner as resistor R1 to open the circuit to coil 18, thus providing additional fail-safe capability. Resistor 14 is used in all SCR circuits to insure that the SCR is triggered only by a gate signal (i.e., no "self turn-on"), and resistor R15 presents a small impedance to the output of amplifier Q2 to prevent overloading. Capacitor C7 also prevents false turn-on by restricting the rate or rise of voltage on the anode of SCR Q3. Capacitor C8, in combination with the inductance of the primary winding of transformer L2, establishes the frequency of oscillation when a grounded neutral exists. Capacitors C9 and C10 are additional noise filters, rejecting spurious signals on terminals 6 and 3, respectively, of amplifier Q2. Varistor V1 is provided to suppress surges in voltage from the AC power source.

Although many design modifications and selection of satisfactory component values will be apparent to those skilled in the art, while utilizing the principles of the invention, the following are provided as suggested values for the components of the disclosed circuit configuration and have been utilized in commercially successful GFCIs.

| Resistors: | R1 330Ω, ⅛ W |
| --- | --- |
| | R2 10KΩ, 2 W, 10% |
| | R3 6.8K, ¼ W, 5% |
| | R4 100Ω, ½ W, 5% |
| | R5 3.3 M, ¼ W, 5% |
| | R6 270K, ¼ W, 5% |
| | R7 200Ω, ¼ W, 5% |
| | R8 270K, ¼ W, 5% |
| | R9 CALIBRATION (240K, NOM.) |
| | R10 100KΩ, ¼ W, 5% |
| | R11 47KΩ, ¼ W, 5% |
| | R12 15KΩ, ¼ W, 5% |
| | R13 22Ω, ¼ W, 5% |
| | R14 1KΩ, ¼ W, 5% |
| | R15 470Ω, ¼ W, 5% |
| Zeners: | Z1 27 VDC |
| | Z2 16 VDC |
| | Z3 27 VDC |
| Capacitors: | C1 1 µfd/50 VDC MIN ALUMINUM |
| | C2 .1 µfd/50 VDC MIN POLYESTER |
| | C3, C5 22 µfd/10 VDC MIN ALUMINUM |
| | C4 33 pfd/50 VDC MIN CERAMIC |
| | C6, C9, C10 .001 µfd/50 VDC MIN CERAMIC |
| | C7 .001 µfd/400 VDC CERAMIC |
| | C8 .01 µfd/50 VDC MIN MYLAR |

From the foregoing it will be apparent that the disclosed GFCI provides a number of desireable and improved features, among which are the reduction of power dissipation heat in the relay coil feed circuit, reducing the likelihood of relay contact chatter or welding, providing protection for the switching transistor without sacrificing relay operating time, as well as the various features contributing to fail-safe operation, including the use of a relay having normally open switch contacts which are closed to complete the source to load circuit only when the relay coil is energized.

Fail-safe operation in the event of a short circuit across the collector and emitter of the switching transistor is also provided by placing a fusible element (R1) in the circuit to the collector; a standard fuse may be used rather than the low power resistor, although the latter will normally be found to be cheaper, or other fusible means such as fine gauge wire or even portions of the printed circuit could be substituted, if desired.

With regard to the use of the relay coil as the series pass element, replacing the usual, relatively large resistor normally employed in such capacity, it should also be noted that amplifier Q2 is powered by current passing through the coil and connected to the amplifier at pin 7 thereof. It is possible that diode D1 may not be necessary in certain circuit designs if the values and ratings of other components are appropriately modified. Some means is required to keep the power supplied to the amplifier within the necessary limits which, in the disclosed embodiment comprise zener Z1, interposed between the output side of the coil and ground, which is preferably connected in parallel with capacitor C1.

What is claimed is:

1. A ground fault circuit interrupter for opening a power distribution line including hot and neutral conductors and extending between an electrical power source and a load, said interrupter comprising:
    (a) a relay having at least one member interposed in said distribution line and movable between open and closed positions with respect thereto, means biasing said member to said open position, and a coil operable to move said member to said closed position in response to current flow through said coil;
    (b) at least one sensing means adapted to generate a signal in response to an imbalance of current flow in the conductors of said distribution line, indicating a ground fault condition;
    (c) a power supply line communicating with said power distribution line to provide current to said coil to maintain said member in said closed position;
    (d) switching means electrically connected to said coil and operable in response to said signal to remove current from said coil, thereby permitting said member to move to said normally open position and interrupting the circuit through said distribution line between said source and said load; and
    (e) circuit means so arranged with respect to said coil, said sensing means and said switching means that current is removed from said coil in the event of said ground fault condition when a short circuit across said switching means is present.

2. The invention according to claim 1 wherein said switching means comprises a transistor.

3. The invention according to claim 2 wherein said transistor is an NPN transistor connecting said power supply line through collector and emitter to the input of said coil, said short circuit being a short across said collector and emitter.

4. The invention according to claim 3 wherein said circuit means includes a fusible element connected in said power supply line to said collector and having a power rating such that said fusible element operates to open the line to said collector by the power applied thereto upon the occurence of said short.

5. The invention according to claim 4 wherein said fusible element is a resistor.

6. The invention according to claim 1 wherein said power source is an AC power source, and further including a diode bridge rectifier having an input connected to said distribution line and an output connected to said power supply line, whereby the power supplied to said coil is pulsating DC power.

7. The invention according to claim 6 and further including a free-wheeling diode and a zener connected in series across the input and output sides of said coil.

8. The invention according to claim 7 wherein said switching means comprises an NPN transistor connecting said power supply line through collector and emitter to said coil input, said transistor having a voltage rating substantially in excess of the voltage applied thereto upon turn-off of said transistor as a result of said zener being connected across said coil.

9. The invention according to claim 1 wherein said sensing means includes an amplifier and the input side of said coil is connected to said power supply line through said switching means and the output side is connected to the power input of said amplifier, whereby said coil provides the series pass element to said amplifier.

10. The invention according to claim 9 wherein said output side of said coil is also connected to ground through means limiting the power supplied to said amplifier to not greater than a predeter mined value.

11. The invention according to claim 10 wherein said power limiting means comprises a zener.

12. The invention according to claim 11 and further including a capacitor connected in parallel with said zener.

13. The invention according to claim 12 wherein the charging current of said capacitor during turn-on places a substantial additional voltage on said coil thereby assisting in moving said member to said closed position thereof.

14. The invention according to claim 1 wherein said sensing means comprises a differential transformer having a core through which said distribution line passes and forms the primary winding, and a secondary winding connected to the input terminals of an operational amplifier.

15. The invention according to claim 14 wherein said core is a toroidal ferrite core.

16. The invention according to claim 15 wherein said distribution line comprises separate hot and neutral conductors, each passing through said core and forming a separate, single-turn primary of said transformer, said signal being generated in response to an imbalance of current flow through said primaries.

17. The invention according to claim 16 wherein said relay includes one of said movable members interposed in each of said conductors.

18. The invention according to claim 16 and further comprising a second differential transformer having a core through which said two conductors pass and form separate, single-turn secondaries of said second transformer, the latter also including a primary winding on said core and providing means for creating said imbalance of current flow when a path to ground through said neutral conductor exists on the load side of said transformers.

19. The invention according to claim 4 and further comprising an SCR having a gate connected for triggering said SCR in response to said signal, and an anode and cathode providing a path to ground 20. The invention according to claim 19 and further including a capacitor and a resistor respectively connected to the gate and cathode of said SCR and having relative values established to maintain said SCR in the conducting state until said capacitor is discharged.

21. The invention according to claim 20 and further including a pair of manually actuated switch means interposed in said circuit means, actuation of a first of said switch means causing an imbalance of current flow in said conductors, and actuation of a second of said switches causing said capacitor to discharge.

22. A ground fault circuit interrupter for opening a power distribution line between an electrical power source and a load, said interrupter comprising:

(a) a relay having at least one member interposed in said distribution line and movable between open and closed positions with respect thereto, means biasing said member to said open position, and a coil operable to move said member to said closed position in response to current flow through said coil;

(b) at least one sensing means including a differential transformer and an amplifier adapted to generate a signal in response to a predetermined condition of said distribution line indicating a malfunction;

(c) a power supply line communicating with said power distribution line to provide current to said coil to maintain said member in said closed position;

(d) switching means electrically connected to said coil and operable in response to said signal to remove current from said coil, thereby permitting said member to move to said normally open position and interrupting the circuit through said distribution line between said source and said load; and (e) the input side of said coil being connected to said power supply line through said switching means and the output side to the power input of said amplifier with no intervening current-limiting elements, whereby said coil provides the sole power supply energy limiter to said amplifier.

23. The invention according to claim 22 wherein said output side of said coil is also connected to ground through means limiting the power supplied to said amplifier to not greater than a predetermined value.

24. The invention according to claim 23 wherein said power limiting means comprises a zener.

25. The invention according to claim 24 and further including a capacitor connected in parallel with said zener.

26. An electro-mechanical relay and circuit for operation thereof from an AC power source comprising, in combination:

(a) at least one pair of relatively movable contacts biased and positioned in a distribution line between said AC power source and a load operated thereby;

(b) a coil having input and output sides, and constructed and arranged to move said contacts to a closed position upon current flow through said coil;

(c) a bridge rectifier having an input connected to said AC power source and a pulsating DC output;

(d) switching means connected between said rectifier output and said coil input;

(e) means for actuating said switching means between conducting and non-conducting states to allow and prevent, respectively, flow of current to said coil; and (f) a capacitor connected between said coil output and ground, the charging current of said capacitor during turn-on upon actuation of said switching means to said conducting state placing a substantial additional voltage on said coil, thereby assisting in moving said contacts to said closed position to decrease the possibility of contact chatter or welding.

27. The invention according to claim 26 and further including a zener connected in parallel with said capacitor.

28. The invention according to claim 26 and further including sensing means adapted to generate a signal in response to a ground fault condition in said distribution line on the load side of said contacts, said switching means being actuated in response to said signal.

* * * * *